United States Patent
Yokota et al.

(10) Patent No.: US 10,266,055 B2
(45) Date of Patent: Apr. 23, 2019

(54) VEHICLE-MOUNTED EQUIPMENT OPERATING DEVICE AND VEHICLE-MOUNTED EQUIPMENT OPERATING SYSTEM

(71) Applicant: MITSUBISHI ELECTRIC CORPORATION, Tokyo (JP)

(72) Inventors: Hiroyuki Yokota, Kobe (JP); Yasuaki Takimoto, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 107 days.

(21) Appl. No.: 15/534,113

(22) PCT Filed: Feb. 6, 2015

(86) PCT No.: PCT/JP2015/053395
§ 371 (c)(1),
(2) Date: Jun. 8, 2017

(87) PCT Pub. No.: WO2016/125304
PCT Pub. Date: Aug. 11, 2016

(65) Prior Publication Data
US 2019/0009676 A1 Jan. 10, 2019

(51) Int. Cl.
*B62D 1/04* (2006.01)
*B60K 37/06* (2006.01)
(Continued)

(52) U.S. Cl.
CPC .............. *B60K 37/06* (2013.01); *B62D 1/046* (2013.01); *G06F 3/0416* (2013.01);
(Continued)

(58) Field of Classification Search
CPC ............ B60K 37/06; B60K 2350/1036; B60K 2350/1016; B60K 2350/928; G06F 3/0484; G06F 3/0416; G06F 3/0488; B62D 1/046
See application file for complete search history.

(56) References Cited

U.S. PATENT DOCUMENTS

| 2008/0143505 A1 | 6/2008 | Maruyama et al. |
| 2013/0063336 A1* | 3/2013 | Sugimoto .............. B60K 35/00 345/156 |

(Continued)

FOREIGN PATENT DOCUMENTS

| JP | 2007-326490 A | 12/2007 |
| JP | 2013-25620 A | 12/2007 |
| JP | 2008-150029 A | 7/2008 |

*Primary Examiner* — Abhishek Sarma
(74) *Attorney, Agent, or Firm* — Birch, Stewart, Kolasch & Birch, LLP

(57) ABSTRACT

A vehicle-mounted equipment operating device includes a display and a touch sensor, which are provided in a ring-shaped area of a steering wheel, and when detecting a driver's motion on a detection target range which is defined with reference to a holding position at which the steering wheel is being held by the driver, in accordance with information detected by the touch sensor, a vehicle-mounted equipment operating device generates a video in which an operation screen for vehicle-mounted equipment is arranged in a display area of the display which is defined with reference to the position of the motion, and displays the video on the display.

11 Claims, 13 Drawing Sheets

(51) Int. Cl.
    *G06F 3/041*     (2006.01)
    *G06F 3/0484*     (2013.01)
    *G06F 3/0488*     (2013.01)

(52) U.S. Cl.
    CPC .......... *G06F 3/0484* (2013.01); *G06F 3/0488* (2013.01); *B60K 2350/1016* (2013.01); *B60K 2350/1036* (2013.01); *B60K 2350/928* (2013.01)

(56) References Cited

U.S. PATENT DOCUMENTS

2015/0066294 A1\* 3/2015 Sivertsen ............... B60K 35/00
    701/36
2016/0004383 A1\* 1/2016 Goodlein .............. G06F 3/0488
    345/173

\* cited by examiner

FIG.3A
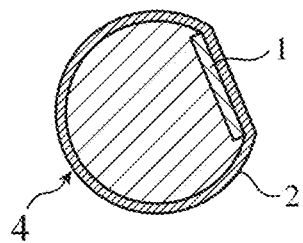
FIG.3B
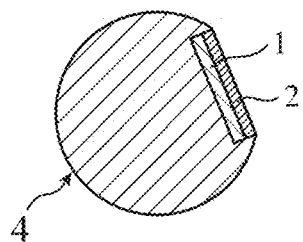
FIG.3C
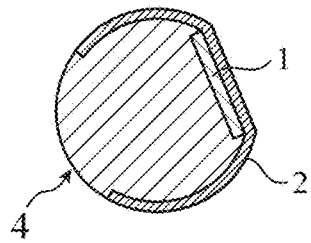
FIG.4
| Left Hand | Right Hand |
|---|---|
| ⇖ | ⇖ |
| ⟲ | ⟲ |
| ⇑ | ⇑ |

VEHICLE-MOUNTED EQUIPMENT OPERATING DEVICE AND VEHICLE-MOUNTED EQUIPMENT OPERATING SYSTEM

TECHNICAL FIELD

The present invention relates to a vehicle-mounted equipment operating device that presents an operation screen for vehicle-mounted equipment to a driver, and a vehicle-mounted equipment operating system provided with the vehicle-mounted equipment device.

BACKGROUND ART

For example, a vehicle-mounted system according to Patent Literature 1 includes a display disposed on a center pad of a steering wheel, a touch panel disposed on the display, and a user interface controller that displays a screen, in which buttons are arranged, on the display and that receives a driver's operation on a button. The user interface controller displays a screen in which buttons are arranged, in the form of an arc of a circle, in each of right and left sides of a display area of the display, thereby enabling the driver to move only the thumb of his or her hand to operate a button without taking either hand holding the steering wheel off the steering wheel. The user interface controller also moves the position of the arc disposed in each of the right and left sides of the display area of the display in accordance with the holding position of the steering wheel, thereby being able to ensure a high degree of ease of use regardless of the driver's driving state.

CITATION LIST

Patent Literature

Patent Literature 1: Japanese Unexamined Patent Application Publication No. 2013-25620

SUMMARY OF INVENTION

Technical Problem

Although the vehicle-mounted system according to above-mentioned Patent Literature 1 is based on the premise that the driver operates a button in a state in which the driver is holding the right and left portions of the center pad of the steering wheel, there is a case in which the driver's thumb does not reach the center pad while the driver holds the steering wheel at the current position because the position at which the steering wheel is being held by hands differs for each driver, and the position at which the steering wheel is being held by hands also varies according to the driving state. Therefore, a problem is that a high degree of ease of use is not necessarily ensured for the driver.

The present invention is made in order to solve the above-mentioned problems, and it is therefore an object of the present invention to provide a vehicle-mounted equipment operating device that provides a high degree of ease of use so as to enable the driver to operate vehicle-mounted equipment without taking either hand off the steering wheel and without moving his or her hands while holding the steering wheel.

Solution to Problem

According to the present invention, there is provided a vehicle-mounted equipment operating device connected to a display provided in a ring-shaped area of a steering wheel, the ring-shaped area facing a driver, and a touch sensor provided in an area of said steering wheel, the area covering at least said display, said vehicle-mounted equipment operating device includes a holding position detector to detect a holding position at which said steering wheel is being held by said driver in accordance with information detected by said touch sensor, a motion detector to detect a predetermined motion performed by said driver and a position of the motion in accordance with the information detected by said touch sensor, the motion being performed in a detection target range of said touch sensor which is defined with reference to the holding position detected by said holding position detector, and a video generator to, when said motion detector detects the motion performed by said driver and the position of the motion, generate a video image in which an operation screen for vehicle-mounted equipment is arranged in a display area of said display which is defined with reference to said motion position.

Advantageous Effects of Invention

When the driver's motion is detected within the detection target range which is defined with reference to the holding position of the steering wheel held by the driver, the vehicle-mounted equipment operating device according to the present invention generates a video in which an operation screen for the vehicle-mounted equipment is arranged in the display area of the display which is defined with reference to the motion position, so that the vehicle-mounted equipment operating device makes it possible for the driver to operate the vehicle-mounted equipment without taking either hand off the steering wheel and without moving his or her hands while holding the steering wheel, and can provide a high degree of ease of use.

BRIEF DESCRIPTION OF DRAWINGS

FIGS. 3A to 3C are cross-sectional views, taken along the line A-A of FIG. 2, of the steering wheel in which the display and the touch sensor according to Embodiment 1 are disposed;

FIG. 4 is a diagram showing examples of a display instructing motion;

DESCRIPTION OF EMBODIMENTS

Hereafter, in order to explain this invention in greater detail, the preferred embodiments of the present invention will be described with reference to the accompanying drawings.

Embodiment 1

Figure 1:
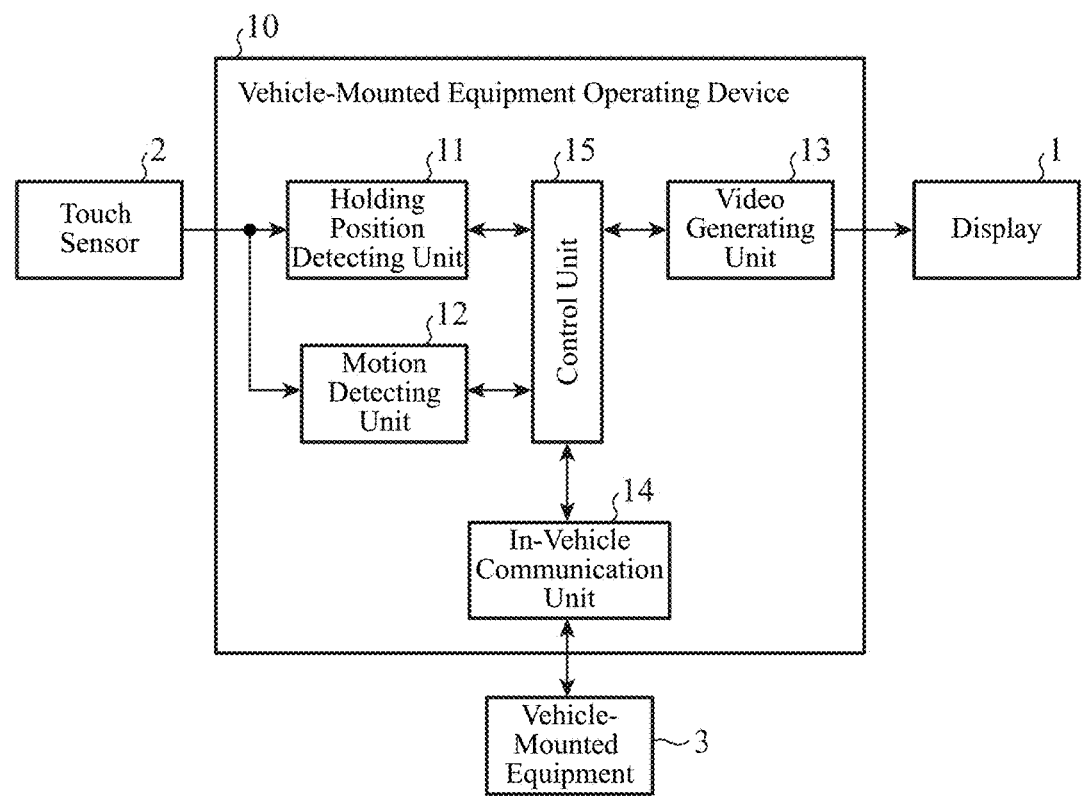
FIG. 1 is a block diagram showing an example of the configuration of a vehicle-mounted equipment operating system according to Embodiment 1 of the present invention.

As shown in FIG. 1, a vehicle-mounted equipment operating system according to Embodiment 1 operates vehicle-mounted equipment 3, and includes a display 1, a touch sensor 2 and a vehicle-mounted equipment operating device 10. The vehicle-mounted equipment 3 includes equipment of any type as long as the vehicle-mounted equipment is mounted in a vehicle. For example, the vehicle-mounted equipment includes a navigation device, an audio device or a radio device.

Figure 2:
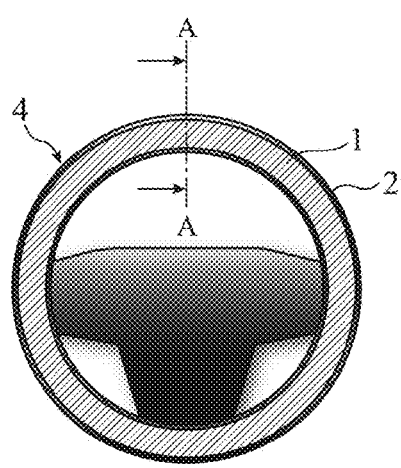
FIG. 2 is a diagram showing an example of a steering wheel in which a display and a touch sensor according to Embodiment 1 are disposed.

FIG. 2 is a diagram showing an example of a steering wheel 4 in which the display 1 and the touch sensor 2 are disposed. FIGS. 3A to 3C are cross-sectional views of the steering wheel 4 taken along the line A-A of FIG. 2.

The display 1 is disposed in a ring-shaped area of the steering wheel 4, the ring-shaped area facing the driver. The display 1 displays a video, such as an operation screen for the vehicle-mounted equipment 3, received from the vehicle-mounted equipment operating device 10.

The touch sensor 2 detects the contact of the driver's fingers with the steering wheel 4 and the contact positions of the fingers and outputs these pieces of information to the vehicle-mounted equipment operating device 10. The touch sensor 2 is disposed in an area of the steering wheel 4, the area covering at least the display 1, in such a way as to be able to detect the position of a hand with which the driver is holding the steering wheel 4, and also detect the position of a display instructing motion which the driver performs using the thumb or the like of the hand with which the driver is holding the steering wheel 4. Concretely, the touch sensor 2 can be disposed around the entire perimeter of the cross section of the steering wheel 4, as shown in FIG. 3A, can be disposed only in an area of the steering wheel 4, the area covering the display 1, as shown in FIG. 3B, or can be disposed in areas of the steering wheel 4 extending above and below the display 1, as well as in the area of the steering wheel 4, which covers the display 1, as shown in FIG. 3C.

The steering wheel 4 does not have to be formed into a complete annular ring shape as illustrated, and can be formed into a partially-distorted shape or a shape in which a part is cut away. In this case, the display 1 and the touch sensor 2 do not have to be formed into a complete annular ring shape, and can be formed into a partially-distorted shape or shape whose part is cut away.

The vehicle-mounted equipment operating device 10 is installed, for example, in the vicinity of the steering wheel 4 shown in FIG. 2. This vehicle-mounted equipment operating device 10 includes a holding position detecting unit 11, a motion detecting unit 12, a video generating unit 13, an in-vehicle communication unit 14 and a control unit 15.

The holding position detecting unit 11 receives information detected by the touch sensor 2, detects the holding position at which the steering wheel 4 is held by the driver, and notifies the control unit 15 of the holding position.

For example, the touch sensor 2 detects the contact positions of the driver's fingers along the annular ring of the steering wheel 4, and outputs this positional information, and the holding position detecting unit 11 sets up a coordinate system which is defined with reference to a fixed point on the annular ring and which extends along the annular ring, and specifies the coordinates of the holding position from the information detected by the touch sensor 2.

When receiving the holding position information detected by the holding position detecting unit 11 via the control unit 15, the motion detecting unit 12 detects both a display instructing motion which the driver performs in a detection target range of the touch sensor 2 which is defined with reference to the holding position, and the position of the motion, in accordance with the information detected by the touch sensor 2, and notifies the control unit 15 of both the display instructing motion and the position of the motion. Concretely, when the driver's motion performed in the detection target range of the touch sensor 2 matches a predetermined display instructing motion, the motion detecting unit 12 detects that the driver has performed the display instructing motion, and detects the position on which the motion has been performed. The detection target range is provided in order to discriminate between a motion using a finger of a hand with which the driver is holding the steering wheel 4, and other motions, and the range of the touch sensor, which the driver's finger can reach while the driver holds the steering wheel 4, is defined in advance as the detection target range. For example, a range of 10 cm, in upward and downward directions and along the annular ring of the steering wheel 4, from the holding position is predetermined. The upward and downward directions referred to in this specification mean, in principle, that as to the left hand, a clockwise direction in which the driver's finger moves from the holding position of the steering wheel 4 along the annular ring is defined as the upward direction and a counterclockwise direction in which the driver's finger moves from the holding position is defined as the downward direction, whereas as to the right hand, a counterclockwise direction in which the driver's finger moves from the holding position along the annular ring is defined as the upward direction and a clockwise direction in which the driver's finger moves from the holding position is defined as the downward direction.

For example, the motion detecting unit 12 also sets up the coordinate system which is defined with reference to the fixed point on the annular ring of the steering wheel 4 and which extends along the annular ring, like the holding position detecting unit 11, and specifies the coordinates of the position of the motion from the information detected by the touch sensor 2.

When the driver holds the steering wheel 4 with his or her left and right hands, the holding position detecting unit 11 detects two holding positions. In this case, the motion detecting unit 12 can set a detection target range for each of the two holding positions, and detect a display instructing motion on each of the detection target ranges.

Display instructing motion examples are shown in FIG. 4. In each of these examples, it is assumed that the driver performs the display instructing motion by using the thumb of his or her left or right hand with which the driver is holding the steering wheel 4, and the locus of the thumb at a time when the driver performs the display instructing motion is shown. The driver performs one of the display instructing motion examples, which are shown in FIG. 4, by using the thumb of a hand with which the driver is holding the steering wheel 4, thereby instructing the vehicle-mounted equipment operating device 10 to display an operation screen for the vehicle-mounted equipment 3.

The display instructing motions are not limited to the examples shown in FIG. 4, and it is preferable that the driver can set up any display instructing motion.

Further, when receiving an instruction to detect an operational motion from the control unit 15, the motion detecting unit 12 detects both an operational motion which the driver has performed on the operation screen and the position of the motion, in accordance with the information detected by the touch sensor 2, and notifies the control unit 15 of both the operational motion and the position.

When receiving the notification of both the display instructing motion and the position of the motion which are detected by the motion detecting unit 12 via the control unit 15, the video generating unit 13 generates a video in which an operation screen for the vehicle-mounted equipment 3 is arranged in the display area of the display 1 which is defined with reference to the position of the motion, and outputs the video to the display 1. As a result, the operation screen for the vehicle-mounted equipment 3 is displayed at the position at which the driver is holding the steering wheel 4.

Further, when receiving an instruction to make a transition to another operation screen from the control unit 15, the video generating unit 13 generates a video in which the other operation screen after transition is arranged in accordance with the transition instruction, and outputs the video to the display 1. As a result, the vehicle-mounted equipment operating device makes a transition from the operation screen for the vehicle-mounted equipment 3 which is currently being displayed by the display 1 to the other operation screen.

Except when outputting the video, in which the operation screen is arranged, to the display 1, the video generating unit 13 can output a predetermined background video to the display 1, output a background video having the same color as that of the steering wheel 4 to the display 1, or switch off the back light of the display 1 for power saving. The driver may set up the background video.

The video generating unit 13 outputs information showing whether the video currently being displayed on the display 1 includes either only the background video or an operation screen, and outputs information showing, when the video includes the operation screen, at which of the display 1 the operation screen is arranged, and at which of the operation screen what button is arranged, to the control unit 15.

Figure 5A:
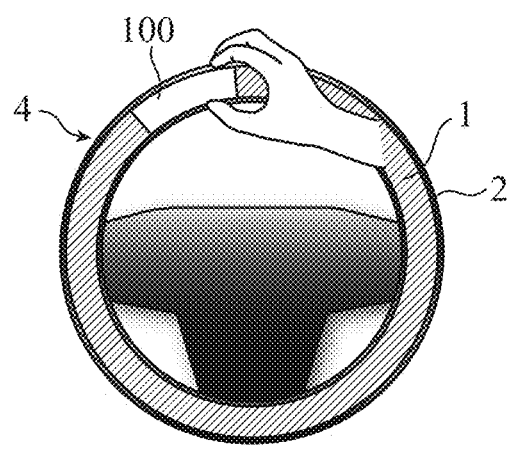
FIGS. 5A and 5B are diagrams showing an example of arrangement of a display area in which an operation screen is displayed.
Figure 5B:
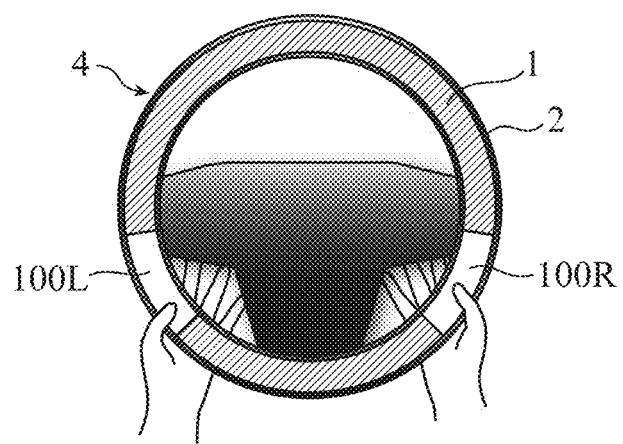

Examples of arrangement of display areas 100, 100L, and 100R in which an operation screen is displayed are shown in FIG. 5. Each of the display areas 100, 100L, and 100R is set with reference to the position of a motion detected by the motion detecting unit 12. As shown in FIG. 5A, when the driver holds an upper part of the steering wheel 4 with his or her right hand, the display area 100 is set in such a way as to be located in the vicinity of the right hand. As shown in FIG. 5B, in a case where the driver holds a lower part of the steering wheel 4 with his or her both hands, when the driver performs a display instructing motion with his or her left hand, the display area 100L is set in such a way as to be located in the vicinity of his or her left hand, and when the driver performs a display instructing motion with his or her right hand, the display area 100R is set in such a way as to be located in the vicinity of his or her right hand, and when the driver performs a display instructing motion with each of his or her left and right hands, the display area 100L is set in such a way as to be located in the vicinity of his or her left hand, and the display area 100R is also set in such a way as to be located in the vicinity of his or her right hand.

An operation screen for the vehicle-mounted equipment 3 is thus displayed in each of these display areas 100, 100L and 100R. It is desirable that the size of each of the display areas 100, 100L and 100R falls within a range which the driver can reach with his or her finger without taking either hand holding the steering wheel 4 off the steering wheel 4.

The in-vehicle communication unit 14 communicates with the vehicle-mounted equipment 3 via an in-vehicle communication network such as Controller Area Network (CAN). When receiving operation information about an operation performed on the vehicle-mounted equipment 3 from the control unit 15, the in-vehicle communication unit 14 transmits the operation information to the vehicle-mounted equipment 3 via the CAN. Further, when the vehicle-mounted equipment 3 provides a notification for the vehicle-mounted equipment operating device 10, the in-vehicle communication unit 14 receives the notification via the CAN and outputs the notification to the control unit 15.

In FIG. 1, the case in which the vehicle-mounted equipment operating device 10 and the vehicle-mounted equipment 3 communicate with each other via the CAN is exemplified, which necessitates the in-vehicle communication unit 14. In contrast, in a case in which the vehicle-mounted equipment operating device 10 and the vehicle-mounted equipment 3 communicate directly with each other without using the CAN, the in-vehicle communication unit 14 can be eliminated.

The control unit 15 controls the operations of the vehicle-mounted equipment operating device 10, and instructs the holding position detecting unit 11, the motion detecting unit 12, the video generating unit 13 and the in-vehicle communication unit 14 to operate and relays exchange of data among them.

Further, a correspondence between each operational motion on the operation screen and a piece of operation information is preset to the control unit 15. When receiving information showing an operational motion on an operation screen from the motion detecting unit 12, the control unit 15 determines the operation information about the vehicle-mounted equipment 3, the operation information corresponding to the operational motion performed at the position of the motion, and transmits the operation information to the vehicle-mounted equipment 3 via the in-vehicle communication unit 14. For example, when an operational motion to select a button is performed on an operation screen in which this button is displayed, the control unit 15 determines the operation information assigned to the selected button and transmits the operation information to the vehicle-mounted equipment 3 via the in-vehicle communication unit 14.

Next, the operations of the vehicle-mounted equipment operating device 10 will be explained by using flow charts of FIGS. 6 and 8, and concrete examples shown in FIG. 7.

Figure 6:
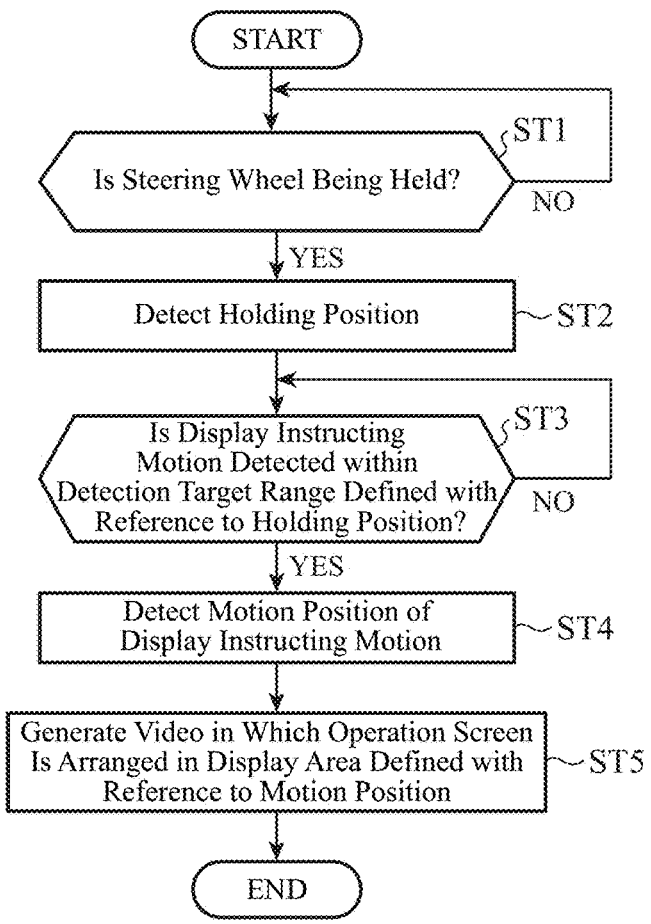
FIG. 6 is a flow chart explaining an operation of the vehicle-mounted equipment operating device according to Embodiment 1, and shows an operation of displaying an operation screen for vehicle-mounted equipment on a display.

FIG. 6 is a flowchart showing an operation of displaying an operation screen for the vehicle-mounted equipment 3 on the display 1, which is performed by the vehicle-mounted equipment operating device 10.

It is assumed that the vehicle-mounted equipment operating device is placed in a state in which the video generating unit 13 outputs, for example, the background video having the same color as that of the steering wheel 4 to the display 1, and does not display any operation screen for the vehicle-mounted equipment 3 on the display 1. In this state, the holding position detecting unit 11 determines whether or not the steering wheel 4 is being held by the driver in accordance with information detected by the touch sensor 2 (step ST1). When determining that the steering wheel 4 is being held by the driver ("YES" in step ST1), the holding position detecting unit 11 detects a holding position (step ST2), and notifies the motion detecting unit 12 of the holding position via the control unit 15. In contrast, when determining that the steering wheel 4 is not being held by the driver ("NO" in step ST1), the holding position detecting unit 11 repeats step ST1.

When receiving the notification of the holding position from the holding position detecting unit 11 via the control unit 15, the motion detecting unit 12 starts detecting a display instructing motion within the detection target range which is defined with reference to the holding position (step ST3). When detecting that the driver has performed a predetermined display instructing motion within the detection target range ("YES" in step ST3), the motion detecting unit 12 detects the motion position of the display instructing motion (step ST4), and notifies the video generating unit 13 of the motion position via the control unit 15. In contrast, when not detecting any display instructing motion ("NO" in step ST3), the motion detecting unit 12 repeats step ST3.

When receiving the notification of both the display instructing motion and the motion position from the motion detecting unit 12 via the control unit 15, the video generating unit 13 generates a video in which the operation screen for the vehicle-mounted equipment 3 is arranged in the display area which is defined with reference to the motion position (step ST5), and outputs the video to the display 1. The display 1 displays the video received from the video generating unit 13.

Figure 7A:
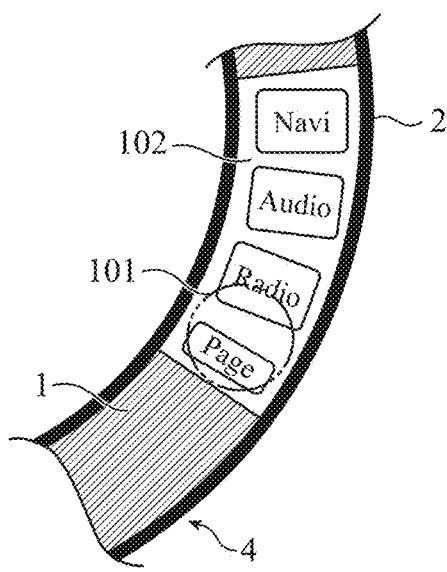
FIGS. 7A and 7B are diagrams showing examples of the operation screen displayed on the display.
Figure 7B:
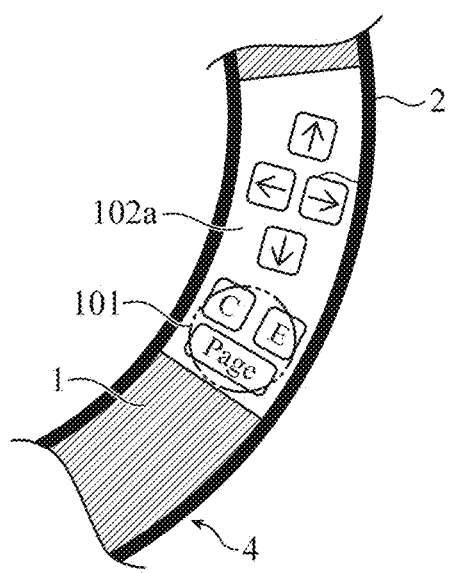

Examples of the operation screen displayed on the display 1 are shown in FIG. 7. As shown in FIG. 7A, a display area is set in the display 1 in such a way as to be located in the upward direction with reference to a motion position 101 of a display instructing motion, and an operation screen 102 including various buttons, such as a "Navi" button, is displayed in the display area. The "Navi" button is a button used for making a transition to an operation screen 102a, as shown in FIG. 7B, for allowing the driver to operate the navigation device. An "Audio" button is a button used for making a transition to an operation screen for allowing the driver to operate the audio device. A "Radio" button is a button used for making a transition to an operation screen for allowing the driver to operate the radio device. A "Page" button is a button used for making a transition to another page of the operation screen 102.

FIG. 7B shows the operation screen 102a for the navigation device to which the display makes a transition when the "Navi" button shown in FIG. 7A is operated. In this operation screen 102a, cursor buttons ("↑", "↓", "←", and "→") for moving the position of a cursor displayed on the display of the navigation device in the upward, downward, leftward, and rightward directions, an "E" button for determining an operation, a "C" button for cancelling an operation, and a "Page" button are displayed.

Figure 8:
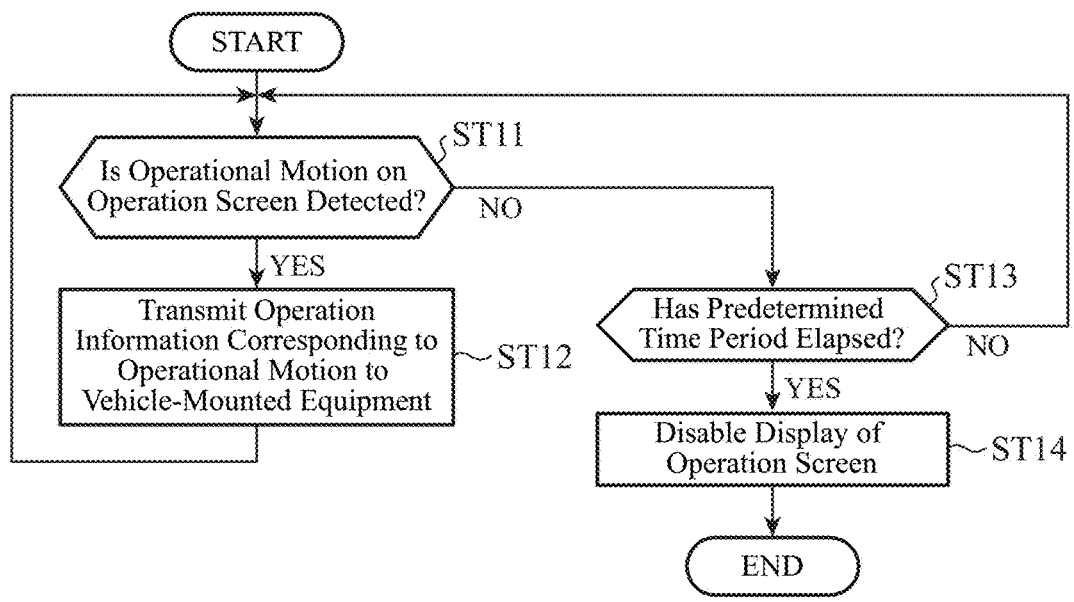
FIG. 8 is a flow chart explaining an operation of the vehicle-mounted equipment operating device according to Embodiment 1, and shows an operation of operating the vehicle-mounted equipment in accordance with an operation on the operation screen.

FIG. 8 is a flow chart showing an operation of operating the vehicle-mounted equipment 3 in accordance with an operational motion on an operation screen, which is performed by the vehicle-mounted equipment operating device 10.

It is assumed hereafter that, as a result of performing the operation shown in the flow chart of FIG. 6, the vehicle-mounted equipment operating device 10 is placed in a state in which an operation screen for the vehicle-mounted equipment 3 is displayed on the display 1. In this state, the control unit 15 instructs the motion detecting unit 12 to detect an operational motion which the driver performs on the operation screen for the vehicle-mounted equipment 3. The control unit 15 also receives pieces of information including the position at which the operation screen is arranged in the screen of the display 1 and the positions at which buttons are arranged in the operation screen from the video generating unit 13, and recognizes the content of the video.

When receiving the instruction to detect an operational motion from the control unit 15, the motion detecting unit 12 starts detecting an operational motion which the driver has performed on the operation screen and the position of the motion in accordance with the information detected by the touch sensor 2 (step ST11). When detecting the operational motion and the position of the motion ("YES" in step ST11), the motion detecting unit 12 notifies the control unit 15 of both the operational motion and the position of the motion.

If the driver's hand holding the steering wheel 4 (hereinafter referred to as a holding hand) is placed on the operation screen at the time that the display 1 starts displaying the operation screen, the motion detecting unit 12 does detect the contact of a finger of the holding hand with the touch sensor even if the driver does not have an intention of operating the vehicle-mounted equipment 3 or the like. To solve this problem, the motion detecting unit 12 does not detect any contact of a finger at the time that the display starts displaying the operation screen, but detects the contact of a finger after the start of the display of the operation screen.

When receiving the notification of both the operational motion and the position of the motion from the motion detecting unit 12, the control unit 15 determines on which button the operational motion has been performed in accordance with the operational motion and the position of the motion, and outputs the operation information assigned to the button to the in-vehicle communication unit 14. The in-vehicle communication unit 14 transmits the operation information received from the control unit 15 to the vehicle-mounted equipment 3 (step ST12). For example, when the operational motion is the pushdown of the cursor button ("↑") shown in FIG. 7B, the control unit 15 transmits the operation information, showing that the position of the cursor displayed by the navigation device is moved upwardly, to the navigation device via the in-vehicle communication unit 14.

Further, although not illustrated in the flow chart of FIG. 8, when, in step ST12, the operation information corresponding to both the operational motion and the position of the motion which are notified from the motion detecting unit 12 is aimed at making a transition to another operation screen, the control unit 15 outputs an instruction to make a transition to the other operation screen to the video generating unit 13.

The video generating unit 13 makes a transition from the operation screen currently being displayed on the display 1 to the other operation screen. For example, when the operation information is information about an operational motion to push down the "Navi" button shown in FIG. 7A, the control unit 15 outputs an instruction to make a transition from the operation screen currently being displayed to an operation screen for the navigation device to the video generating unit 13, and the video generating unit 13 makes a transition from the operation screen 102 shown in FIG. 7A to the operation screen 102a shown in FIG. 7B.

In contrast, when no operational motion on the operation screen is detected by the motion detecting unit 12 ("NO" in step ST11), the control unit 15 starts measuring a time (step ST13) and repeats the processes of steps ST11 and ST13 until a predetermined time period (e.g. 5 seconds) has elapsed. When no operational motion on the operation screen is detected until the predetermined time period has elapsed ("YES" in step ST13), the control unit 15 outputs an instruction to disable the display of the operation screen to the video generating unit 13 (step ST14). When receiving the instruction to disable the display of the operation screen from the control unit 15, the video generating unit 13 displays only the background video on the display 1 or turns off the back light of the display 1. The video generating unit 13 does not have to turn off the back light immediately after no operational motion on the operation screen is detected until the predetermined time period has elapsed. For example, after a predetermined time period of 5 seconds has elapsed in step ST13, the control unit 15, in step ST14, can cause the video generating unit 13 to reduce the intensity of illumination of the back light, and, after that, repeat the processes of step ST11 and ST13 again and cause the video generating unit 13 to turn off the back light after 5 seconds have further elapsed.

The vehicle-mounted equipment operating device 10 returns to step ST1 of FIG. 6 after performing the process of step ST14.

Figure 9:
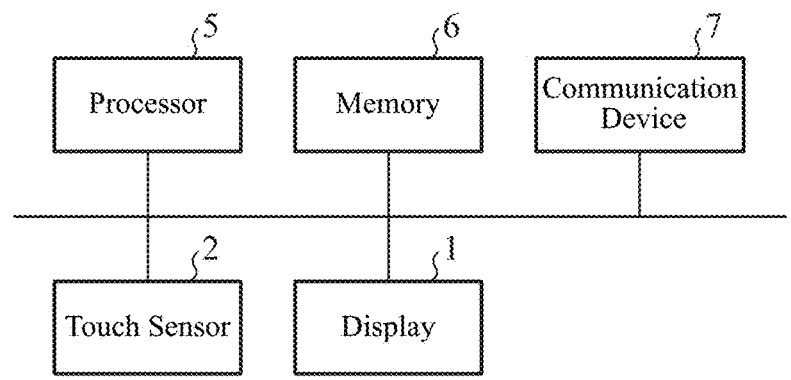
FIG. 9 is a diagram of the hardware configuration of the vehicle-mounted equipment operating system according to Embodiment 1.

FIG. 9 is a hardware configuration diagram of the vehicle-mounted equipment operating system. The holding position detecting unit 11, the motion detecting unit 12, the video generating unit 13 and the control unit 15, which are shown in FIG. 1, are implemented by a processor 5 that executes a program stored in a memory 6. The processor 5 is a processing circuit, such as a CPU or a system LSI. As an alternative, a plurality of processors and a plurality of memories can perform the above-mentioned functions in cooperation with each other. The in-vehicle communication unit 14 is a communication device 7 that communicates with the vehicle-mounted equipment 3 via the CAN or the like. The display 1, the touch sensor 2, the processor 5, the memory 6, and the communication device 7 are connected to one another via a bus or the like, and can carry out exchange of information with one another.

As mentioned above, because the vehicle-mounted equipment operating system according to Embodiment 1 is configured in such a way that the vehicle-mounted equipment operating system includes the display 1 provided in a ring-shaped area of the steering wheel 4, the ring-shaped area facing the driver, the touch sensor 2 provided in an area of the steering wheel 4, the area covering at least the display 1, and the vehicle-mounted equipment operating device 10, and the vehicle-mounted equipment operating device 10 includes the holding position detecting unit 11 for detecting the holding position at which the steering wheel 4 is being held by the driver in accordance with information detected by the touch sensor 2, the motion detecting unit 12 for detecting a predetermined display instructing motion performed by the driver and the position of the motion in accordance with the information detected by the touch sensor 2, the display instructing motion being performed on the detection target range of the touch sensor 2 which is defined with reference to the holding position detected by the holding position detecting unit 11, and the video generating unit 13 for, when the motion detecting unit 12 detects a display instructing motion performed by the driver and the position of the motion, generating a video image in which an operation screen for the vehicle-mounted equipment 3 is arranged in a display area of the display 1 which is defined with reference to the motion position, so that the vehicle-mounted equipment operating system can display the operation screen within a range which a finger of a hand with which the driver is holding the steering wheel 4 can reach. Therefore, the vehicle-mounted equipment operating system and the vehicle-mounted equipment operating device 10 according to this embodiment make it possible for the driver to operate the vehicle-mounted equipment 3 without taking either hand off the steering wheel 4 and without moving his or her hands while holding the steering wheel, and can provide a high degree of ease of use.

Embodiment 2

In Embodiment 2, the display mode of an operation screen displayed on a display 1 is configured to be changed freely in accordance with a change instruction provided by the driver.

Figure 10:
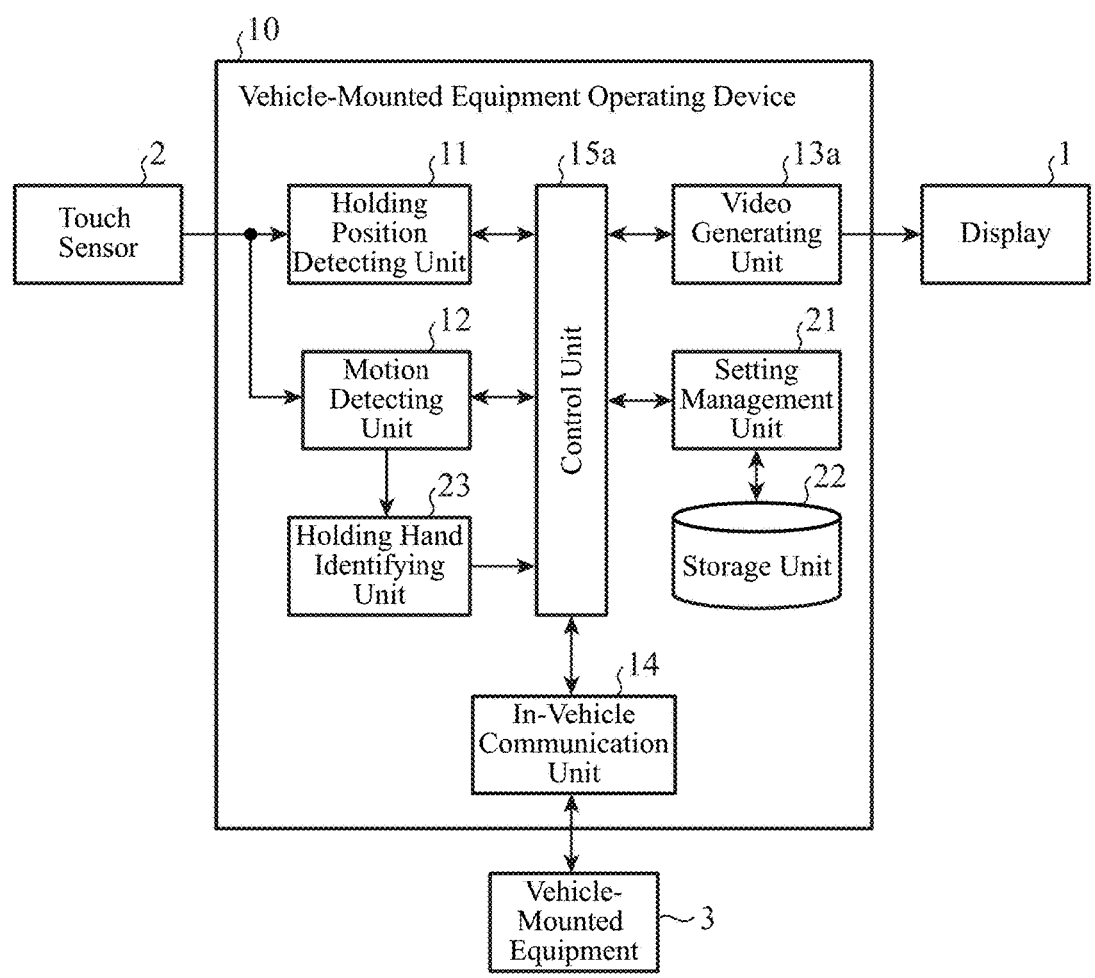
FIG. 10 is a block diagram showing an example of the configuration of a vehicle-mounted equipment operating system according to Embodiment 2 of the present invention.

FIG. 10 is a block diagram showing an example of the configuration of a vehicle-mounted equipment operating system according to Embodiment 2. A vehicle-mounted equipment operating device 10 according to Embodiment 2 is configured to include a setting management unit 21, a storage unit 22 and a holding hand identifying unit 23, in addition to the components of the vehicle-mounted equipment operating device 10 according to Embodiment 1 shown in FIG. 1. In FIG. 10, the same components as those of FIG. 1 or corresponding components are designated by the same reference numerals, and the explanation of the components will be omitted hereafter.

The setting management unit 21 and the holding hand identifying unit 23 are implemented by causing a processor 5 shown in FIG. 9 to execute a program stored in a memory 6. The storage unit 22 is the memory 6.

The setting management unit 21 manages information about the settings of the display modes of operation screens. The setting information is stored in the storage unit 22. The setting management unit 21 also receives a change instruction to change the display mode of an operation screen from the driver, and changes the setting information stored in the storage unit 22. The driver provides such a change instruction by, for example, operating an operation screen for setting change which is displayed on the display 1, and a motion detecting unit 12 detects a change instructing motion performed on the operation screen for setting change in accordance with information from a touch sensor 2 and notifies the setting management unit 21 of the change instructing motion via a control unit 15*a*.

The control unit 15*a* and a video generating unit 13*a* receive the setting information stored in the storage unit 22 from the setting management unit 21, and control each component and generate a video in accordance with the setting information.

Hereafter, an example of a setting change of the display mode of an operation screen will be explained.

For example, as the display mode of the operation screen, a change of a positional relationship between a motion position detected by the motion detecting unit 12 and a display area in which an operation screen is arranged is enabled. The setting management unit 21 changes the setting information which is stored in the storage unit 22 and which defines the positional relationship between the motion position and the display area in accordance with a change instruction provided by the driver, and outputs the changed setting information to the video generating unit 13*a*.

Figure 11A:
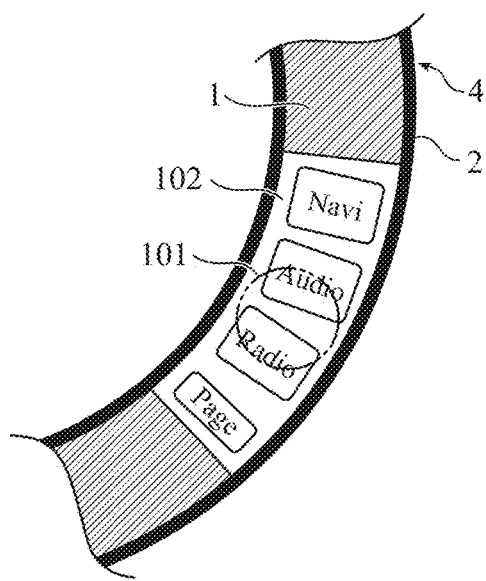
FIGS. 11A and 11B are diagrams showing an example of changing a positional relationship between the motion position of a display instructing motion, and a display area in which an operation screen is displayed.
Figure 11B:
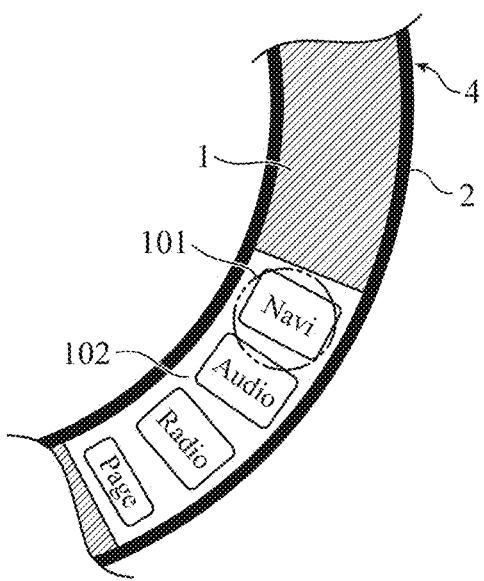

When the setting information has indicates that a display area is arranged upwardly with reference to the motion position of a display instructing motion detected by the motion detecting unit 12, the video generating unit 13*a* generates a video, as shown in FIG. 7, in which a display area of an operation screen 102 is arranged above the motion position 101. When the setting information indicates that display areas are arranged above and below the motion position, centering on the motion position, the video generating unit 13*a* generates a video having a positional relationship as shown in FIG. 11A. When the setting information indicates that a display area is arranged downwardly with reference to the motion position, the video generating unit 13*a* generates a video having a positional relationship as shown in FIG. 11B.

Thus, the driver can freely change the arrangement of the display area relative to the motion position, so that the operation screen can be displayed only within a range of the display screen which the driver can operate without moving his or her hands and without straining himself or herself while the driver holds the steering wheel 4.

Further, for example, as the display mode of the operation screen, a change of the size of the display area in which the operation screen is arranged is enabled in accordance with a change instruction provided by the driver. The setting management unit 21 changes the setting information which is stored in the storage unit 22 and which defines the size of the display area in accordance with the change instruction provided by the driver, and outputs the changed setting information to the video generating unit 13*a*.

Figure 12A:
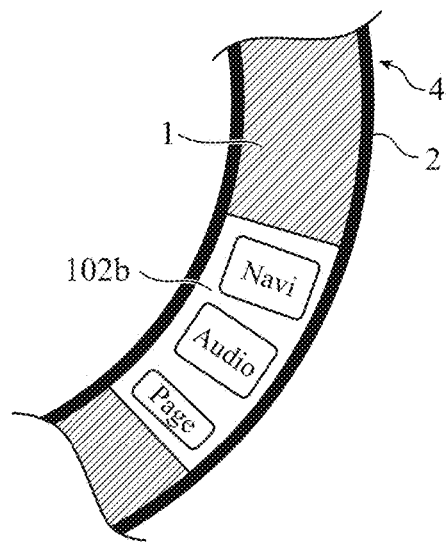
FIGS. 12A and 12B are diagrams showing an example of changing the size of the display area in which the operation screen is arranged.

When the display area shown in FIG. 7A has an initial size and the setting information indicates that its size is decreased to a size which is smaller than the initial size by one step, the video generating unit 13*a* decreases the size of the display area to the size which is smaller than this initial size by one step, for example, as shown in FIG. 12A. In the example shown in FIG. 12A, the video generating unit 13*a* generates an operation screen 102*b* which does not have a "Radio" button, unlike the operation screen 102 shown in FIG. 7A, in order to fit the size of the operation screen to the small display area. In this case, the "Radio" button is arranged in, for example, the next page.

Figure 12B:
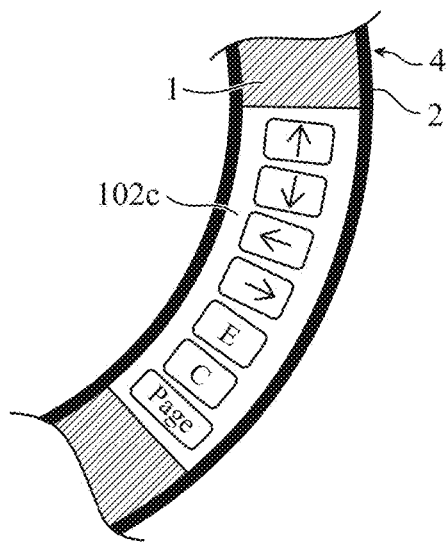

When the display area shown in FIG. 7B has an initial size and the setting information indicates that its size is increased to a size which is larger than this initial size by one step, the video generating unit 13*a* increases the size of the display area to the size which is larger than the initial size by one step, for example, as shown in FIG. 12B. In the example shown in FIG. 12B, the video generating unit 13*a* generates an operation screen 102*c* in which buttons are arranged in a line, in order to fit the size of the operation screen to the large display area.

Thus, the driver can freely change the size of the display area, so that the operation screen can be displayed only within a range of the display screen which the driver can operate without moving his or her hands and without straining himself or herself while the driver holds the steering wheel 4.

Further, for example, as the display mode of the operation screen, a change of the content of the operation screen is enabled in accordance with a change instruction provided by the driver. The setting management unit 21 changes the setting information which is stored in the storage unit 22 and which defines the types and arrangement order of buttons arranged in the operation screen in accordance with the change instruction provided by the driver, and outputs the changed setting information to the video generating unit 13*a*.

When the setting information indicates that a "Navi" button, an "Audio" button, a "Radio" button and a "Page" button are arranged in one page in this order, the video generating unit 13*a* generates an operation screen 102, for example, as shown in FIG. 7A, in which the buttons are arranged.

Thus, the driver can freely change the content of the operation screen, so that the driver can cause the vehicle-mounted equipment operating device to keep buttons having a low use frequency from being displayed in the operation screen, and to display buttons having a high use frequency at positions in the operation screen, which makes it easy for the driver to operate the buttons. Therefore, the vehicle-mounted equipment operating device can display an operation screen which provides a high degree of ease of use and a high degree of convenience for the driver.

Further, for example, as the display mode of the operation screen, a change of the content of the operation screen is enabled in accordance with whether the driver's hand holding the steering wheel 4 is a left hand or a right hand. The setting management unit 21 changes the setting information which is stored in the storage unit 22 and which defines a relationship between the holding hand and the operation screen in accordance with a change instruction provided by the driver, and outputs the changed setting information to the video generating unit 13*a*.

A correspondence between display instructing motions and holding hands, for example, as shown in FIG. 4 is preset to the holding hand identifying unit 23. The holding hand identifying unit 23 receives a notification of a display instructing motion detected by the motion detecting unit 12, identifies whether the driver's holding hand is a left hand or a right hand, and outputs a result of the identification to the control unit 15*a*.

When a display instructing motion is detected by the holding position detecting unit 11, the control unit 15*a* receives an identification result, showing which hand, out of the left and right hands of the driver, has been used when the driver has performed the display instructing motion, from the holding hand identifying unit 23, and outputs the result of the identification to the video generating unit 13*a*.

When the setting information indicates that, when either of the display instructing motions of the left hand shown in FIG. 4 is performed, the operation screen 102, as shown in FIG. 7A, including a "Navi" button is displayed, and when either of the display instructing motions of the right hand is performed, an operation screen 102a for a navigation device, as shown in FIG. 7B, is displayed, the video generating unit 13a generates a video in which an operation screen corresponding to the holding hand notified from the control unit 15a is arranged.

Thus, the driver can freely change the correspondence between the content of operation screens and holding hands, so that the vehicle-mounted equipment operating device can display an operation screen that depends upon whether the holding hand is a left hand or a right hand, in accordance with the driver's dominant hand or inclination. Therefore, the vehicle-mounted equipment operating device can display an operation screen which provides a high degree of ease of use and a high degree of convenience for the driver.

Further, for example, as the display mode of the operation screen, a change of the content of the operation screen is enabled in accordance with the type of a display instructing motion which the driver has performed. The setting management unit 21 changes the setting information which is stored in the storage unit 22 and which defines a relationship between display instructing motions and operation screens in accordance with a change instruction provided by the driver, and outputs the changed setting information to the video generating unit 13a.

The control unit 15a outputs the type of the display instructing motion detected by the holding position detecting unit 11 to the video generating unit 13a, together with the position of the motion.

In the case where the setting information indicates that as shown in the top of FIG. 4, when a display instructing motion of flicking twice in the rightward and leftward directions is performed, the operation screen 102 shown in FIG. 7A, which includes the "Navi" button, is displayed, and as shown in a second row from the top of FIG. 4, when a display instructing motion of sliding a finger spirally is performed, the operation screen 102a for the navigation device, as shown in FIG. 7B, is displayed, and as shown in the bottom of FIG. 4, when a display instructing motion of flicking twice in the upward and downward directions is performed, an operation screen for an audio device is displayed, the video generating unit 13a generates a video in which an operation screen corresponding to the type of the display instructing motion notified from the control unit 15a is arranged.

Thus, the driver can freely change the correspondence between the content of operation screens and the types of display instructing motions, so that the driver can cause the vehicle-mounted equipment operating device to display a desired operation screen after performing a small number of operations. Therefore, the degree of ease of use and the degree of convenience can be further improved.

Two or more of the above-mentioned examples of a change of the display mode can be combined.

As mentioned above, because the vehicle-mounted equipment operating device 10 according to Embodiment 2 is configured in such a way that the vehicle-mounted equipment operating device includes the setting management unit 21 for changing the setting of the display mode of an operation screen in accordance with a change instruction provided by the driver, and the video generating unit 13a changes the display mode of the operation screen in accordance with a setting change made by the setting management unit 21, the degree of ease of use can be further improved.

Embodiment 3

As explained in Embodiments 1 and 2, because the vehicle-mounted equipment operating device 10 according to the present invention includes a display 1 disposed in a ring-shaped area of the steering wheel 4, the ring-shaped area facing the driver, there is a possibility that the driver carelessly touches an operation screen currently being displayed and performs an erroneous operation in a state in which the driving load on the driver is high. To solve this problem, according to Embodiment 3, the driver is prevented from operating an operation screen in a state in which the driving load on the driver is high.

Figure 13:
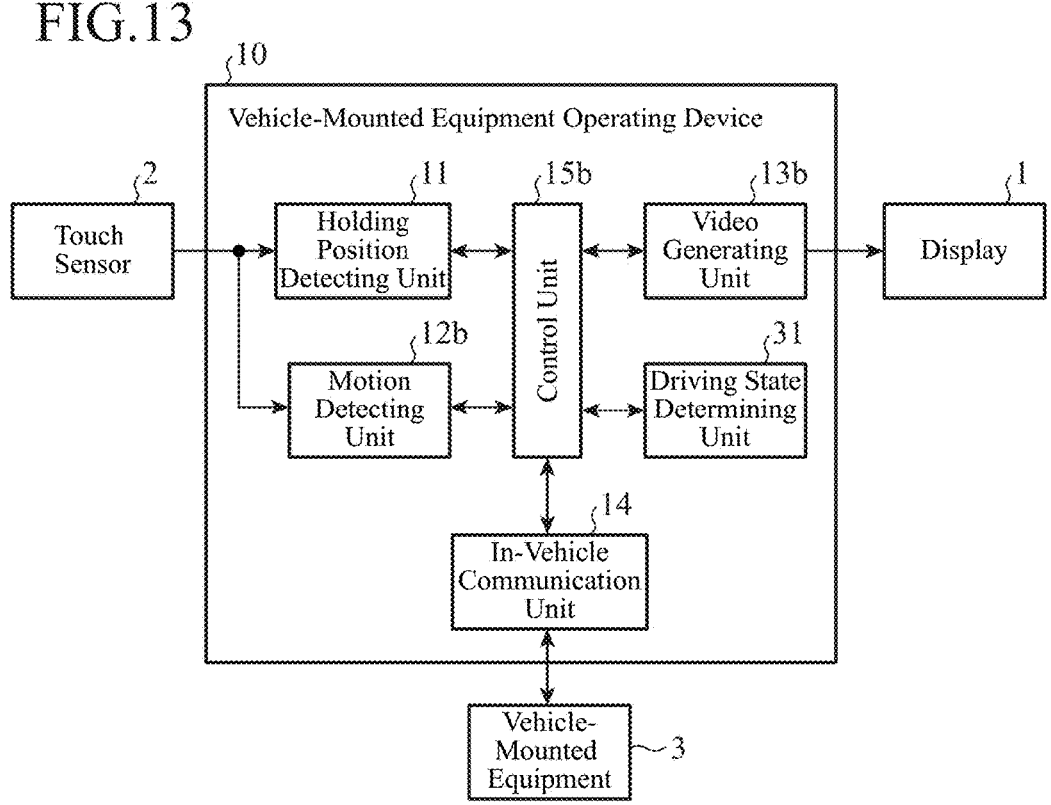
FIG. 13 is a block diagram showing an example of the configuration of a vehicle-mounted equipment operating system according to Embodiment 3 of the present invention.

FIG. 13 is a block diagram showing an example of the configuration of a vehicle-mounted equipment operating system according to Embodiment 3. A vehicle-mounted equipment operating device 10 according to Embodiment 3 is configured to include a driving state determining unit 31 in addition to the components of the vehicle-mounted equipment operating device 10 according to Embodiment 1 shown in FIG. 1. In FIG. 13, the same components as those of FIG. 1 or corresponding components are designated by the same reference numerals, and the explanation of the components will be omitted hereafter.

The driving state determining unit 31 is implemented by execution of a program stored in a memory 6, the execution being performed by a processor 5 shown in FIG. 9.

The driving state determining unit 31 determines whether or not the driving load on the driver is high and, when the driving load is high, notifies a control unit 15b to that effect. As a method of determining whether or not the driving load on the driver is high, there are two types of methods, as will be shown below.

First, a first method of determining whether or not the driving load on the driver is high will be explained.

The driving state determining unit 31 determines whether or not a current driving state is a preset driving state, i.e., whether or not the driving load on the driver is high, in accordance with an amount of change in an amount of operation on an operator for controlling the motion of the vehicle in accordance with an operation performed by the driver. The operator is, for example, an accelerator, a brake pedal or a steering wheel 4. Pieces of information showing the stepping amount of the accelerator and the stepping amount of the brake pedal, and the amount of rotation of the steering wheel 4 are outputted from Electronic Control Unit (ECU) or the like which is vehicle-mounted equipment 3 and inputted to the vehicle-mounted equipment operating device 10 via a CAN. An in-vehicle communication unit 14 receives these pieces of information, and outputs the pieces of information to the driving state determining unit 31 via the control unit 15b.

The driving state determining unit 31 compares the amount of change dp/dt in the stepping amount dp of the accelerator or the brake pedal per unit time dt with a preset threshold. As an alternative, the driving state determining unit 31 compares the amount of change dp/dt in the amount of rotation dp of the steering wheel 4 per unit time dt with a preset threshold. When the amount of change associated with at least one of the accelerator, the brake pedal and the steering wheel 4 is equal to or larger than the threshold, the driving state determining unit 31 determines that the driving load on the driver is high and notifies the control unit 15b to that effect.

The driving state determining unit can alternatively determine whether or not the driving load on the driver is high in accordance with the traveling speed or the rotation angular speed of the vehicle, or the like, but the driving state determining unit cannot determine whether or not the driving load on the driver is high by using only this information even when the traveling speed is low, e.g., when the vehicle is standing or parked. Therefore, it is desirable that the driving state determining unit 31 uses at least one of the stepping amount of the accelerator, the stepping amount of the brake pedal, and the steering amount of the steering wheel 4, in addition to the traveling speed and the rotation angular speed, or instead of the traveling speed and the rotation angular speed.

When notified from the driving state determining unit 31 that the driving load on the driver is high, the control unit 15b instructs a motion detecting unit 12b and a video generating unit 13b to disable an operation screen for the vehicle-mounted equipment 3, in such a way that the driver cannot operate the operation screen.

When receiving the instruction to disable the operation screen from the control unit 15b, the video generating unit 13b displays only a background video without the operation screen on a display 1, or makes the display color of the operation screen dark in such a way as to cause the driver to notice that the operation screen is disabled.

When receiving the instruction to disable the operation screen from the control unit 15b, the motion detecting unit 12b does not detect the driver's operational motion on the operation screen.

Next, an operation of the vehicle-mounted equipment operating device 10 will be explained by using a flow chart of FIG. 14.

Figure 14:
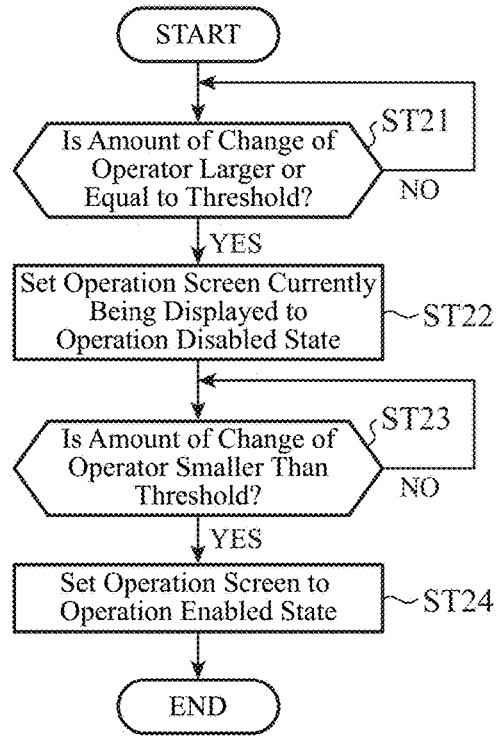
FIG. 14 is a flow chart explaining the operation of a vehicle-mounted equipment operating device according to Embodiment 3.

It is assumed that the driving state determining unit 31 receives information about the amount of operation on an operator, such as the accelerator, from the control unit 15b at regular intervals, while the operation shown in the flow chart of FIG. 14 is performed.

The driving state determining unit 31 compares the amount of change in the amount of operation on the operator, such as the accelerator, with the threshold (step ST21), and when the amount of change in the amount of operation is equal to or larger than the threshold ("YES" in step ST21), the driving state determining unit 31 determines that the driving load on the driver is high and notifies the control unit 15b to that effect. When receiving the notification showing that the driving load on the driver is high from the driving state determining unit 31, the control unit 15b outputs an instruction to disable the operation screen currently being displayed on the display 1 to the motion detecting unit 12b and the video generating unit 13b (step ST22). The motion detecting unit 12b and the video generating unit 13b bring the operation screen into a state in which the operation screen cannot be operated as mentioned above in accordance with instruction from the control unit 15b.

When the amount of change in the amount of operation is smaller than the threshold ("NO" in step ST21), the driving state determining unit 31 repeats the process of step ST21.

Following step ST22, the driving state determining unit 31 compares the amount of change in the amount of operation with the threshold (step ST23), and when the amount of change in the amount of operation is smaller than the threshold ("YES" in step ST23), the driving state determining unit 31 determines that the driving load on the driver is not high and notifies the control unit 15b to that effect. When receiving the notification showing that the driving load on the driver is not high from the driving state determining unit 31, the control unit 15b outputs an instruction to change the operation screen in step ST22, which has been brought into the state in which the operation screen cannot be operated, to the operation screen in the state in which the operation screen can be operated, to the motion detecting unit 12b and the video generating unit 13b (step ST24). The motion detecting unit 12b restarts the detection of the driver's operational motion on the operation screen in accordance with the instruction from the control unit 15b. The video generating unit 13b performs redisplay of a video in which the operation screen is arranged on the display 1 or returns the display color of the operation screen to its original brightness in accordance with the instruction from the control unit 15b.

The vehicle-mounted equipment operating device 10 returns to step ST21 after performing step ST24.

Next, a second method of determining whether or not the driving load on the driver is high will be explained.

Figure 15:
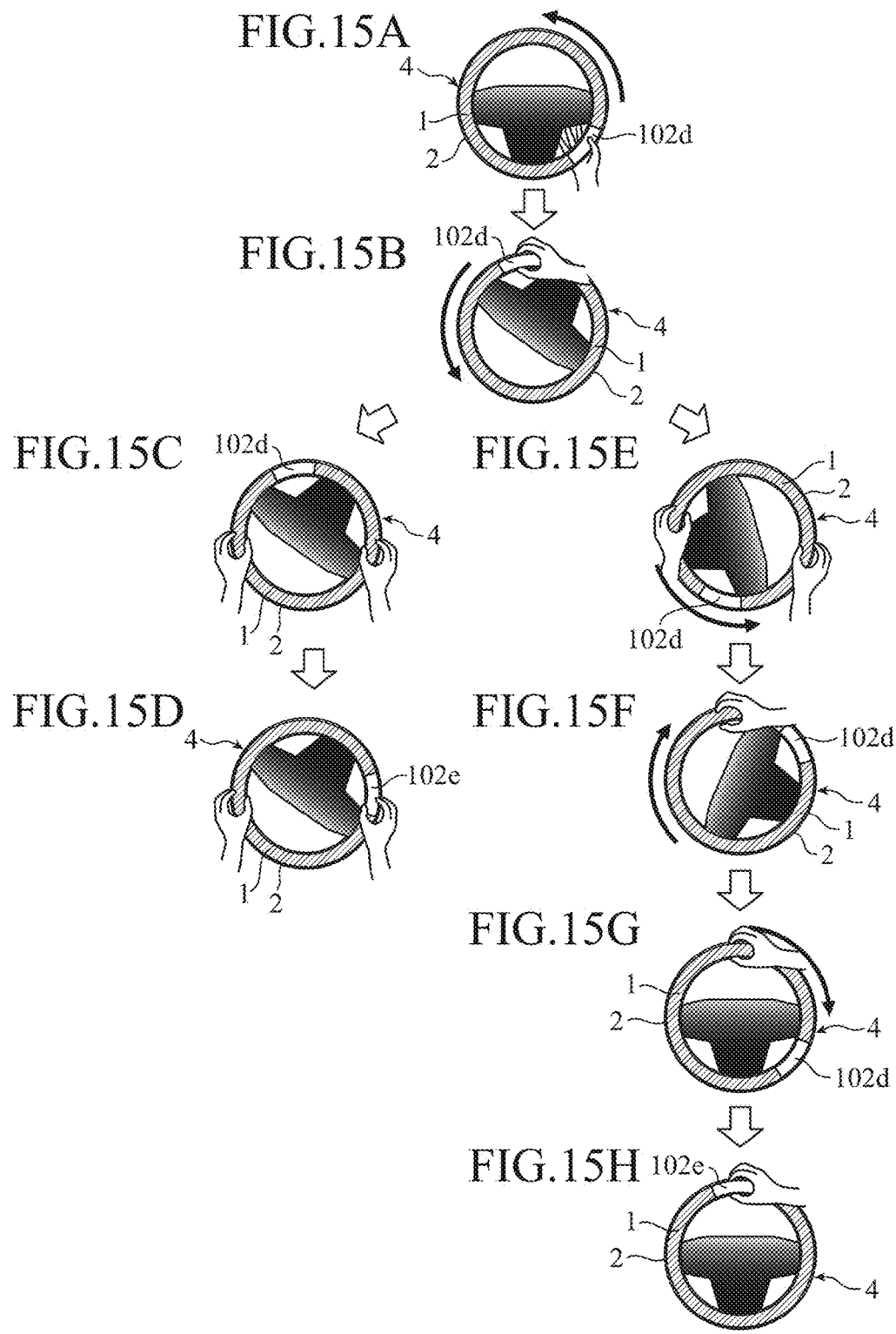
FIGS. 15A to 15H are diagrams showing an example of a movement of a driver's hand while the driver drives his or her vehicle, and an example of arrangement of a display area in which an operation screen is displayed.

When performing a driving operation with a high driving load, such as when making a right or left turn or turning the vehicle around, the driver takes either hand off the steering wheel 4, and then re-holds another position of the steering wheel 4 with his or her hand. Hereafter, a method for enabling the driver to continuously and easily operate the operation screen even when the holding position is changed before and after a driving operation while the operation screen is displayed will be explained using concrete examples shown in FIG. 15 and a flow chart shown in FIG. 16.

It can be considered that after the driver starts operating the steering wheel 4 in order to make a change of traveling direction of the vehicle while an operation screen is displayed, as shown in FIGS. 15A and 15B, the holding position of the steering wheel 4 is changed when the driver temporarily stops the vehicle at an intersection or the like while the steering wheel 4 is held at a steered position, as shown in an example of FIG. 15C.

Here, the position of the steering wheel 4 which the driver is holding before performing a driving operation is referred to as "first holding position." Further, the holding position of the steering wheel to which the first holding position has been changed as a result of this driving operation is referred to as "second holding position."

When the holding position of the steering wheel 4 is changed from the first holding position to the second holding position while the operation screen is displayed, the driving state determining unit 31 determines that the driving load on the driver is high.

Figure 16:
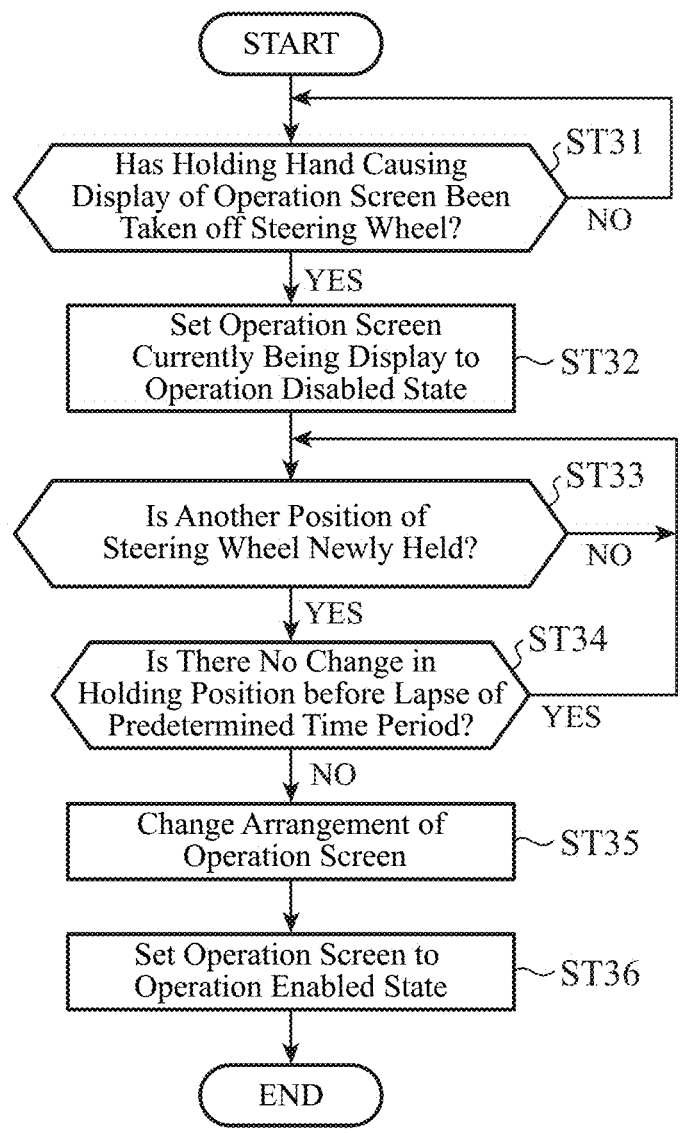
FIG. 16 is a flow chart explaining the operation of a vehicle-mounted equipment operating device according to Embodiment 3.

The driving state determining unit 31, in step ST31 of the flow chart shown in FIG. 16, receives a result of the detection performed by a holding position detecting unit 11 via the control unit 15b, and determines whether the holding hand with which the driver has performed a display instructing motion to display an operation screen 102d, which is currently being display, has been taken off the first holding position of the steering wheel 4. When determining that the holding hand has been taken off the first holding position ("YES" in step ST31), the driving state determining unit 31 determines that the driving load on the driver is high and notifies the control unit 15b to that effect. When receiving the notification showing that the driving load on the driver is high from the driving state determining unit 31, the control unit 15b outputs an instruction to disable the operation screen 102d currently being displayed on the display 1 to the motion detecting unit 12b and the video generating unit 13b (step ST32).

In contrast, when determining that the holding hand has not been taken off the first holding position of the steering wheel 4 ("NO" in step ST31), the driving state determining unit 31 repeats the process of step ST31.

The driving state determining unit 31 then receives a result of the detection performed by the holding position detecting unit 11 via the control unit 15b, and determines whether or not the steering wheel 4 has been re-held by the driver and also determines whether or not the re-holding position is other than the first holding position (step ST33). When the re-holding position is a position different from the first holding position ("YES" in step ST33), the driving state determining unit 31 sets this different position as the second holding position and starts measuring a time, and determines whether the holding hand has been moved from the second holding position to another position before a lapse of a predetermined time period (e.g., 3 seconds) (step ST34).

The predetermined time period is the one for determining whether or not the driving operation of making a change of direction of the vehicle has been completed. More specifically, it is determined that, when the holding hand has been stayed at the second holding position and hence has not been moved from the second holding position before a lapse of the predetermined time period, the driving operation has been completed and the current state has become one in which the driving load on the driver is not high.

When the holding hand has been stayed at the second holding position and hence has not been moved from the second holding position before a lapse of the predetermined time period ("NO" in step ST34), the driving state determining unit 31 notifies the control unit 15b to that effect. When receiving the notification from the driving state determining unit 31, the control unit 15b instructs the video generating unit 13b to move the display position of the operation screen 102d displayed in step ST31 to the second holding position (step ST35). The video generating unit 13b generates a video in which an operation screen 102e is arranged in a display area which is defined with reference to the second holding position specified from the control unit 15b. Although the operation screen 102d and the operation screen 102e have the same content, the positions at which the operation screens 102d and 102e are displayed differ from each other.

Further, the control unit 15b outputs an instruction to enable the operation screen 102e, whose display position has been changed, to the motion detecting unit 12b and the video generating unit 13b (step ST36). As a result, the operation screen 102e is moved to the second holding position of the steering wheel which the driver is currently holding, as shown in FIG. 15D. Therefore, the driver can continue operating the operation screen 102e without taking either hand off the steering wheel 4 and without moving his or her hands while holding the steering wheel 4.

On the other hand, it can be considered that after the driver starts operating the steering wheel 4 in the state shown in FIG. 15B, the driver re-holds the steering wheel 4 in order to make a further change of direction or the like, as shown in FIG. 15E. Also in this case, the control unit 15b, in step ST31 shown in the flow chart of FIG. 16, shifts to the process of step ST32 and brings the operation screen 102d currently being displayed into an operation disabled state, upon a trigger that the driving state determining unit 31 determines that the holding hand with which the driver has performed the display instructing motion to display the operation screen 102d, which is currently being displayed, has been taken off the first holding position of the steering wheel 4, like in the above-mentioned case. When, in next step ST33, determining that the second holding position other than the first holding position has been held, the driving state determining unit 31 shifts to the process of step ST34.

It can be considered that the driver changes the position of his or her hand holding the steering wheel 4 in a short time when the driver has completed the operation of making a change of direction of the vehicle and then returns the steering wheel 4, as shown in FIGS. 15F and 15G, and, in this case, the driving load on the driver is still high. In such a case, because the driver has changed the position of the holding hand from the second holding position to another position before a lapse of the predetermined time period ("YES" in step ST34), the driving state determining unit 31 resets the measurement of the predetermined time period, returns to the process of step ST33, and then starts new determination of the second holding position. The driving state determining unit 31 repeats the processes of steps ST33 and ST34 as long as it is determined in subsequent step ST34 that the holding position has not been changed from the second holding position to another position before a lapse of the predetermined time period.

After that, when the holding position has not been changed from the second holding position to another position before a lapse of the predetermined time period ("NO" in step ST34), as shown in FIG. 15H, the driving state determining unit 31 notifies the control unit 15b to that effect. When receiving the notification from the driving state determining unit 31, the control unit 15b instructs the video generating unit 13b to move the position of the operation screen 102d displayed in step ST31 to the second holding position (step ST35), and also outputs an instruction to enable the operation screen 102e after the positional movement, to the motion detecting unit 12b and the video generating unit 13b (step ST36). As a result, as shown in FIG. 15H, the operation screen 102e is moved to the second holding position at which the driver is currently holding the steering wheel. Therefore, the driver can continue operating the operation screen 102e without taking either hand off the steering wheel 4 and without moving his or her hands while holding the steering wheel.

As mentioned above, the vehicle-mounted equipment operating device 10 according to Embodiment 3 includes the driving state determining unit 31 for determining whether or not the current driving state is a preset driving state, and when the driving state determining unit 31 determines that the current driving state is a preset driving state, the video generating unit 13b disables any operation screen from being displayed. The driving state determining unit 31 is further configured to determine that the current driving state is a preset driving state, i.e., the driving load on the driver is high when the amount of change in the amount of operation on an operator for controlling the motion of the vehicle in accordance with an operation performed by the driver is equal to or larger than the threshold. Therefore, the driver can be prevented from performing an erroneous operation on an operation screen in a state in which the driving load on the driver is high.

Further, the driving state determining unit 31 according to Embodiment 3 determines that a state in which the holding position of the steering wheel 4 is changed from a first holding position to a second holding position while an operation screen is displayed is a preset driving state, i.e., a state in which the driving load on the driver is high, and when the driving state determining unit 31 determines that the driver's holding hand has been taken off the first holding position, the video generating unit 13b disables the display of the operation screen, and when the holding position of the steering wheel 4 has not been changed from the second holding position to another position before a lapse of a preset time period starting at a time when the display of the operation screen has been disabled, the video generating unit 13b generates a video in which an operation screen is arranged in a display area which is defined with reference to the second holding position. Therefore, when the driving load on the driver is reduced from its high state, an operation screen is re-displayed in the vicinity of the holding hand at that time. Therefore, even in a state in which the steering angle of the steering wheel 4 is large when the driving load on the driver is reduced from its high state, the driver can continuously operate the operation screen without re-holding another position of the steering wheel 4 in order to operate the operation screen.

Embodiment 4

As explained in Embodiments 1 to 3, the vehicle-mounted equipment operating device 10 according to the present invention displays an operation screen on the display 1 in accordance with the driver's display instructing motion. In contrast with this, when information is notified from vehicle-mounted equipment 3, a vehicle-mounted equipment operating device according to Embodiment 4 displays an operation screen associated with this information on a display 1.

Figure 17:
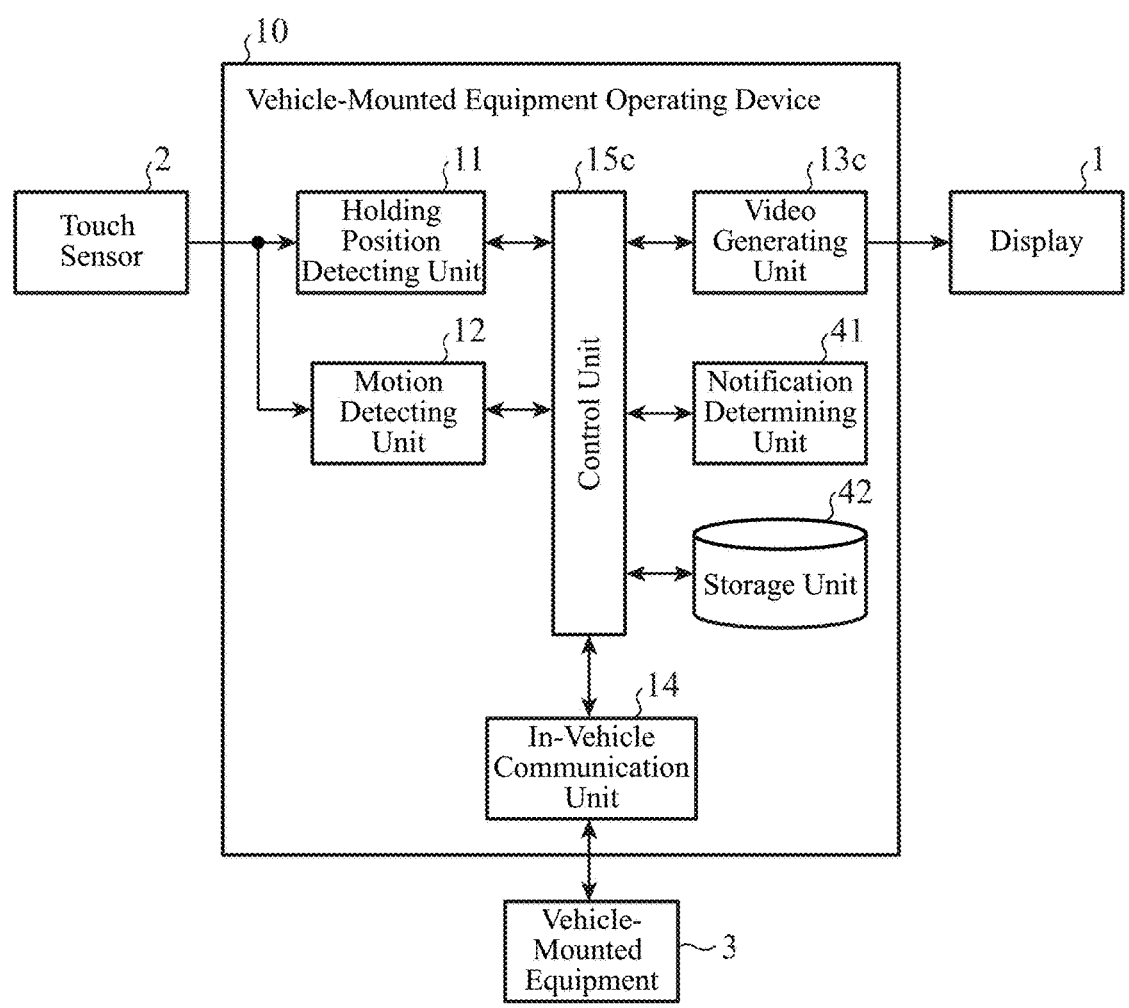
FIG. 17 is a block diagram showing an example of the configuration of a vehicle-mounted equipment operating system according to Embodiment 4 of the present invention.

FIG. 17 is a block diagram showing an example of the configuration of a vehicle-mounted equipment operating system according to Embodiment 4. The vehicle-mounted equipment operating device 10 according to Embodiment 4 is configured to include a notification determining unit 41 and a storage unit in addition to the components of the vehicle-mounted equipment operating device 10 according to Embodiment 1 shown in FIG. 1. In FIG. 17, the same components as those of FIG. 1 or corresponding components are designated by the same reference numerals, and the explanation of the components will be omitted hereafter.

The notification determining unit 41 is implemented by execution of a program stored in a memory 6, the execution being performed by a processor 5 shown in FIG. 9. The storage unit 42 is the memory 6.

The notification determining unit 41 determines whether or not a predetermined type of information is notified from the vehicle-mounted equipment 3, and, when the type of information is notified, notifies a control unit 15c of this information. For example, the information notified from the vehicle-mounted equipment 3 is the one which is notified from a navigation device to the vehicle-mounted equipment operating device 10 via a CAN and which shows an incoming call or the like when, for example, a smart phone connected to the navigation device receives an incoming call, an email or a message. The information notified from the vehicle-mounted equipment can be any information other than information showing an incoming call to a smart phone, or the like as long as the information involves a necessity for the driver to perform a certain operation in response to a notification. An in-vehicle communication unit 14 receives the information showing an incoming call or the like from the vehicle-mounted equipment 3, and outputs the information to the notification determining unit 41 via the control unit 15c.

When changing the operation screen to be displayed on the display 1 from the operation screen currently being displayed to an operation screen corresponding to the information notified from the vehicle-mounted equipment 3, the storage unit 42 temporarily stores the information about the operation screen currently being displayed.

Next, an operation of the vehicle-mounted equipment operating device 10 will be explained by using concrete examples shown in FIG. 18 and a flow chart shown in FIG. 19. Hereafter, a navigation device to which a smart phone is connected will be explained as the vehicle-mounted equipment 3.

Figure 18A:
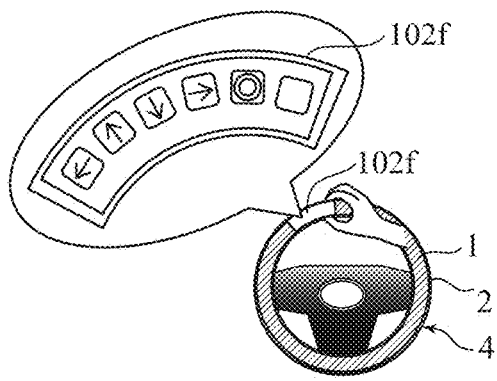
FIGS. 18A to 18C are diagrams showing an example of changing to display of a second operation screen corresponding to a notification from vehicle-mounted equipment during display of a first operation screen.
Figure 18B:
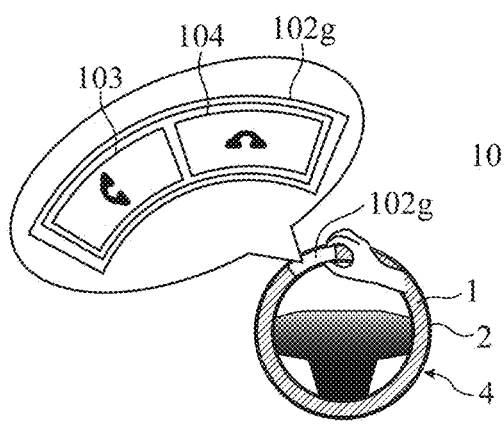
Figure 18C:
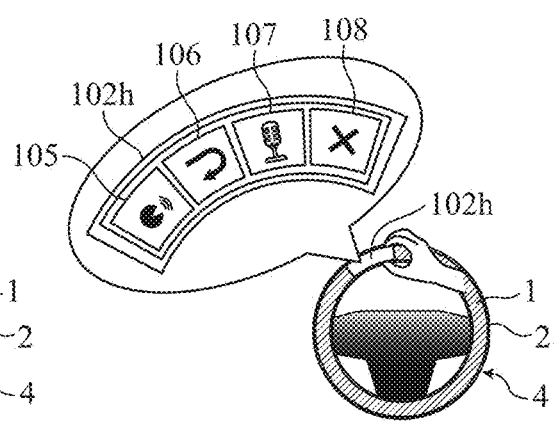

As shown in FIG. 18A, when information about a phone incoming call is notified from the navigation device, to which the smart phone is connected, to the vehicle-mounted equipment operating device 10 while a first operation screen 102f is displayed on the display 1, a second operation screen 102g including an answer button 103 and a hang-up button 104 as shown in FIG. 18B is displayed instead of the first operation screen 102f. Further, when information about reception of an email or message is notified, a second operation screen 102h including a read button 105 to instruct the navigation device to read the message, a reply button 106, a call button 107 to input a message through the driver's utterance, and a cancel or end button 108, as shown in FIG. 18C, is displayed instead of the first operation screen 102f.

Figure 19:
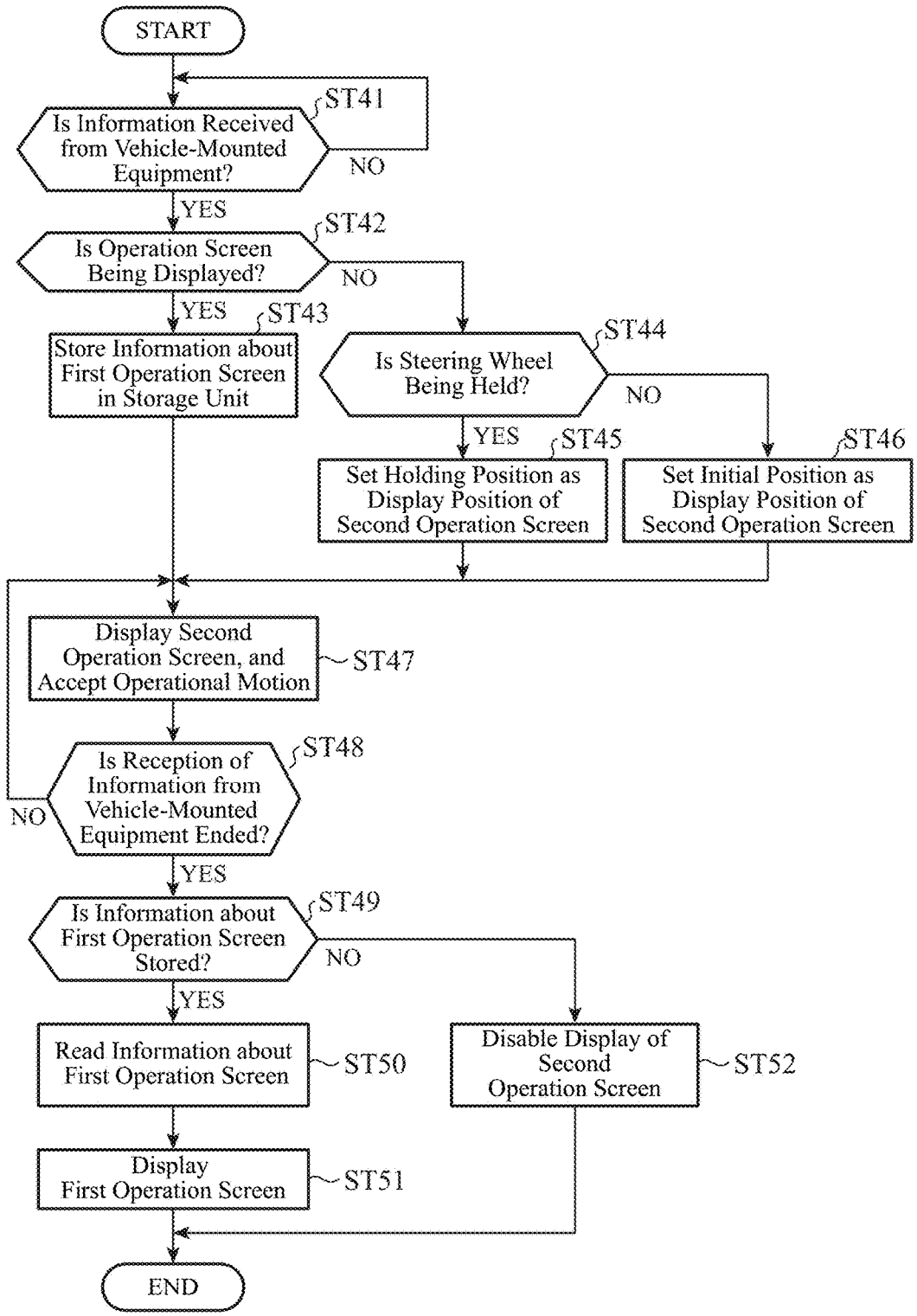
FIG. 19 is a flow chart explaining the operation of a vehicle-mounted equipment operating device according to Embodiment 4.

The notification determining unit 41, in step ST41 of the flowchart shown in FIG. 19, receives the information which the in-vehicle communication unit 14 has received from the vehicle-mounted equipment 3 via the control unit 15c, and determines whether or not this information is a predetermined type of information, i.e., information showing an incoming call or the like. In this example, it is assumed that the notification determining unit 41 determines that the received information is a type of information notifying that the smart phone has received an incoming call, and notifies the control unit 15c of a result of the determination ("YES" in step ST41).

In contrast, when this information is not a predetermined type of information ("NO" in step ST41), the notification determining unit 41 repeats the process of step ST41.

When receiving the result of the determination from the notification determining unit 41 ("YES" in step ST41), the control unit 15c determines whether or not an operation screen is currently being displayed on the display 1 first when displaying an operation screen corresponding to the notification from the vehicle-mounted equipment 3 on the display 1 (step ST42). An operation screen currently being displayed is referred to as "first operation screen", and an operation screen corresponding to the notification from the vehicle-mounted equipment 3 is referred to as "second operation screen." When the first operation screen is currently displayed ("YES" in step ST42), the control unit 15c stores the information about the first operation screen in the storage unit (step ST43), and shifts to step ST47.

In contrast, when the first operation screen is not currently displayed ("NO" in step ST42), the control unit 15c shifts to step ST44.

The control unit 15c, in step ST44, determines whether or not the steering wheel 4 is being held by the driver in accordance with a result of detection performed by a holding position detecting unit 11. When determining that the steering wheel 4 is being held by the driver ("YES" in step ST44), the control unit 15c sets the current holding position as the position which is used as a reference at the time of displaying the second operation screen (step ST45), and shifts to step ST47. When determining that the steering wheel 4 is not being held by the driver ("NO" in step ST44), the control unit 15*c* sets a preset initial position as the position which is used as the reference at the time of displaying the second operation screen (step ST46), and shifts to step ST47. For example, the initial position is the center of a right portion of the steering wheel 4. It is preferable that the driver can set up the initial position. The position set in step ST45 or ST46 is used for the same purpose as that of the motion position of a display instructing motion which is used as a reference at the time when the video generating unit 13*c* according to above-mentioned Embodiment 1 sets up a display area.

The control unit 15*c*, in step ST47, instructs a video generating unit 13*c* to display an operation screen corresponding to the type of information determined by the notification determining unit 41, as the second operation screen, on the display 1. When the first operation screen is currently displayed, the control unit 15*c* instructs the video generating unit 13*c* to stop the display of this first operation screen and display the second operation screen. For example, when the type of information determined by the notification determining unit 41 is a phone incoming call, the control unit 15*c* provides an instruction to display the second operation screen 102*g* corresponding to the phone incoming call as shown in FIG. 18B. When the type of information determined by the notification determining unit 41 is reception of an email or message, the control unit 15*c* provides an instruction to display the second operation screen 102*h* corresponding to the reception of the email or message as shows FIG. 18C. The video generating unit 13*c* arranges the second operation screen 102*g* or 102*h* in the same display area as the first operation screen 102*f* in accordance with the information about the first operation screen, or arranges the second operation screen 102*g* or 102*h* in the display area which is defined with reference to the position set in step ST45 or ST46.

In addition, the control unit 15*c* performs the same operation as that shown in the flow chart shown in FIG. 8 of above-mentioned Embodiment 1, and operates the vehicle-mounted equipment 3 in accordance with the driver's operational motion on the second operation screen 102*g* or 102*h*. Therefore, the driver can operate the second operation screen without taking either hand off the steering wheel 4 and without moving his or her hands while holding the steering wheel.

Next, when the information whose type is determined in step ST41 is no longer received by the in-vehicle communication unit 14 ("YES" in step ST48), the notification determining unit 41 notifies the control unit 15*c* of a request of ending the display of the second operation screen.

In contrast, while the information whose type is determined in step ST41 is received by the in-vehicle communication unit 14 ("NO" in step ST48), the control unit 15*c* repeats the process of step ST47.

When receiving the notification from the notification determining unit 41, the control unit 15*c* determines whether or not the information about the first operation screen is stored in the storage unit 42 (step ST49). That the information is stored in the storage unit 42 means that the first operation screen corresponding to a display instructing motion performed by the driver has been displayed before the second operation screen is displayed. When the information about the first operation screen is stored in the storage unit 42 ("YES" in step ST49), the control unit 15*c* reads the information and outputs this information to the video generating unit 13*c* (step ST50), and also instructs the video generating unit 13*c* to stop the display of the second operation screen and return to display of the first operation screen (step ST51).

In contrast, when the information about the first operation screen is not stored in the storage unit 42 ("NO" in step ST49), the control unit 15*c* instructs the video generating unit 13*c* to stop the display of the second operation screen (step ST52).

As mentioned above, the vehicle-mounted equipment operating device 10 according to Embodiment 4 includes the notification determining unit 41 for determining whether or not information is notified from the vehicle-mounted equipment 3, and when the notification determining unit 41 determines that information is notified, the video generating unit 13*c* generates a video in which an operation screen corresponding to the information is arranged in a display area which is defined with reference to the holding position detected by the holding position detecting unit 11, so that the vehicle-mounted equipment operating device can automatically display the operation screen corresponding to the information notified from the vehicle-mounted equipment 3 at the holding position at which the steering wheel 4 is being held by the driver. Therefore, the driver can perform an operational motion on the vehicle-mounted equipment 3 from which a notification has been received without taking either hand off the steering wheel 4 and without moving his or her hands while holding the steering wheel.

While the present invention has been described in its preferred embodiments, it is to be understood that any combination of two or more of the above-mentioned embodiments can be made, various changes can be made in an arbitrary component according to any one of the above-mentioned embodiments, and an arbitrary component according to any one of the above-mentioned embodiments can be omitted within the scope of the invention.

INDUSTRIAL APPLICABILITY

Because the vehicle-mounted equipment operating device according to the present invention enables a user to perform an operational motion on equipment without moving his or her hand, the vehicle-mounted equipment operating device is suitable for use for a user interface or the like which is disposed in the steering wheel.

REFERENCE SIGNS LIST

1 display, 2 touch sensor, 3 vehicle-mounted equipment, 4 steering wheel, 5 processor, 6 memory, 7 communication device, vehicle-mounted equipment operating unit, 11 holding position detecting unit, 12, 12*b* motion detecting unit, 13, 13*a* to 13*c* video generating unit, 14 in-vehicle communication unit, 15, 15*a* to 15*c* control unit, 21 setting management unit, 22 storage unit, 23 holding hand identifying unit, 31 driving state determining unit, 41 notification determining unit, 42 storage unit, 100, 100L, 100R display area, 101 motion position, 102, 102*a* to 102*h* operation screen, 103 answer button, 104 hang-up button, 105 read button, 106 reply button, 107 call button, 108 cancel or end button.

The invention claimed is:

1. A vehicle-mounted equipment operating device connected to a display provided in a ring-shaped area of a steering wheel, the ring-shaped area facing a driver, and a touch sensor provided in an area of said steering wheel, the area covering at least said display, said vehicle-mounted equipment operating device comprising:
- a holding position detector to detect a holding position at which said steering wheel is being held by said driver in accordance with information detected by said touch sensor;
- a motion detector to detect a predetermined motion performed by said driver and a position of the motion in accordance with the information detected by said touch sensor, the motion being performed in a detection target range of said touch sensor which is defined with reference to the holding position detected by said holding position detector; and
- a video generator to, when said motion detector detects the motion performed by said driver and the position of the motion, generate a video image in which an operation screen for vehicle-mounted equipment is arranged in a display area of said display which is defined with reference to said motion position.

2. The vehicle-mounted equipment operating device according to claim 1, further comprising a setting manager to change a setting of a display mode of said operation screen in accordance with a change instruction provided by said driver, and said video generator changes the display mode of said operation screen in accordance with the setting change made by said setting manager.

3. The vehicle-mounted equipment operating device according to claim 2, wherein said video generator changes a positional relationship between the motion position detected by said motion detector and the display area in which said operation screen is arranged, in accordance with the setting change made by said setting manager.

4. The vehicle-mounted equipment operating device according to claim 2, wherein said video generator changes a size of the display area in which said operation screen is arranged, in accordance with the setting change made by said setting manager.

5. The vehicle-mounted equipment operating device according to claim 2, wherein said video generator changes content of said operation screen in accordance with the setting change made by said setting manager.

6. The vehicle-mounted equipment operating device according to claim 1, further comprising a holding hand identifier to identify whether said driver's hand holding said steering wheel is a left hand or a right hand, and said video generator changes content of said operation screen in accordance with a result of the identification performed by said holding hand identifier.

7. The vehicle-mounted equipment operating device according to claim 1, further comprising a driving state determiner to determine whether or not a current driving state is a preset driving state, and said video generator does not display said operation screen when said driving state determiner determines that the current driving state is said preset driving state.

8. The vehicle-mounted equipment operating device according to claim 7, wherein when an amount of change in an amount of operation on an operator for controlling a motion of a vehicle in accordance with an operation performed by said driver is equal to or higher than a threshold, said driving state determiner determines that the current driving state is said preset driving state.

9. The vehicle-mounted equipment operating device according to claim 7, wherein said driving state determiner determines that a state in which the holding position of said steering wheel changes from a first holding position to a second holding position while said operation screen is displayed is said preset driving state, and
- wherein when said driving state determiner determines that said driver's hand holding the steering wheel has been taken off said first holding position, said video generator disables display of said operation screen, and, when the holding position of said steering wheel does not change from said second holding position to another position before a lapse of a preset time period after the display has been disabled, said video generator generates a video in which said operation screen is arranged in a display area which is defined with reference to said second holding position.

10. The vehicle-mounted equipment operating device according to claim 1, further comprising a notification determiner to determine whether or not information is notified from the vehicle-mounted equipment, and
- wherein when said notification determiner determines that the information is notified from the vehicle-mounted equipment, said video generator generates a video in which an operation screen corresponding to said information is arranged in a display area which is defined with reference to the holding position detected by said holding position detector.

11. A vehicle-mounted equipment operating system comprising:
- a display provided in a ring-shaped area of a steering wheel, the ring-shaped area facing a driver;
- a touch sensor provided in an area of said steering wheel, the area covering at least said display;
- a holding position detector to detect a holding position at which said steering wheel is being held by said driver in accordance with information detected by said touch sensor;
- a motion detector to detect a predetermined motion performed by said driver and a position of the motion in accordance with the information detected by said touch sensor, the motion being performed on a detection target range of said touch sensor which is defined with reference to the holding position detected by said holding position detector; and
- a video generator to, when said motion detector detects the motion performed by said driver and the position of the motion, generate a video image in which an operation screen for vehicle-mounted equipment is arranged in a display area of said display which is defined with reference to said motion position.

\* \* \* \* \*